Patented Oct. 31, 1939

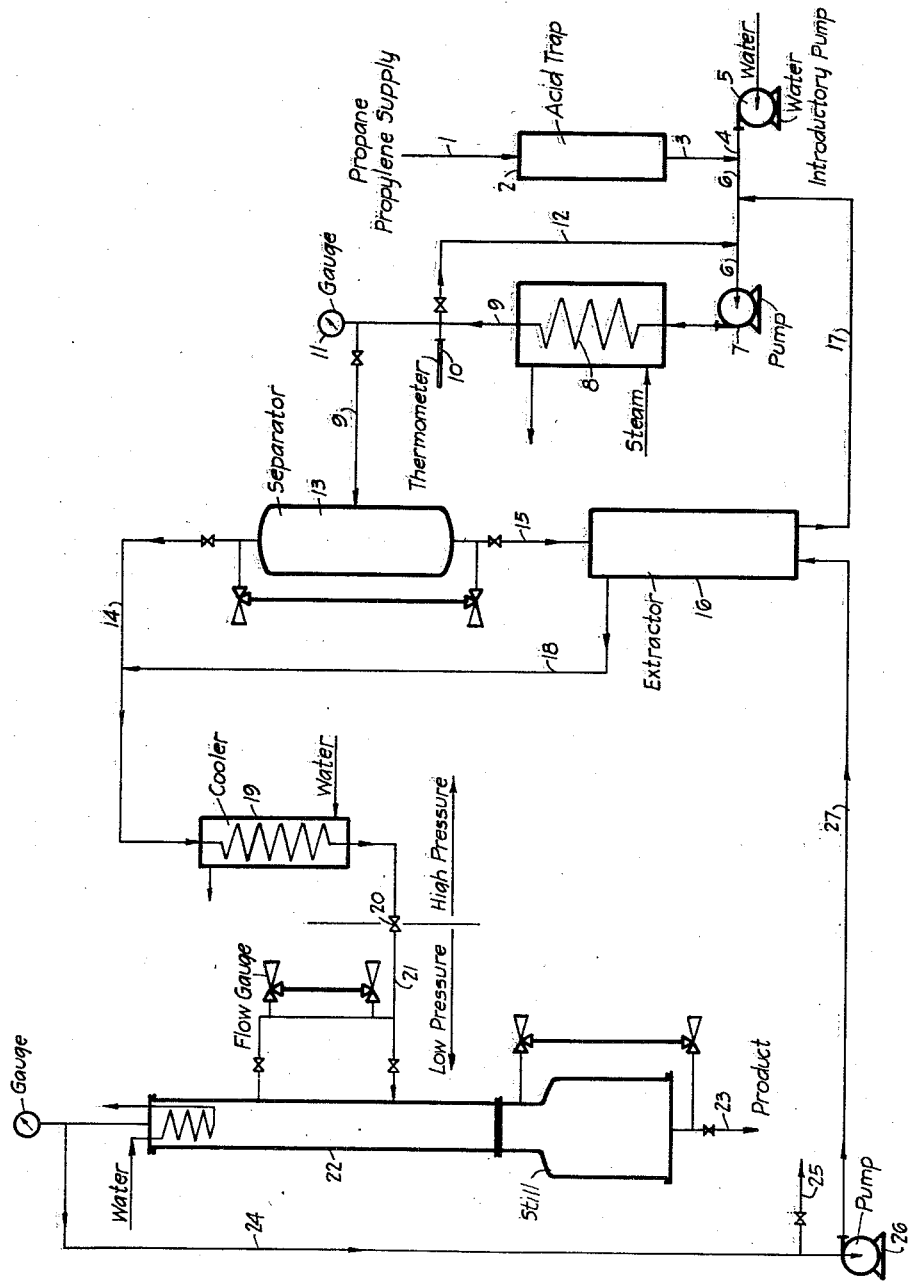

2,178,186

UNITED STATES PATENT OFFICE 2,178,186

MANUFACTURE OF ETHERS FROM OLEFINS

Charles F. Oldershaw, Berkeley, Calif., assignor to Shell Development Company, San Francisco, Calif., a corporation of Delaware Application December 27, 1937, Serial No. 182,029

8 Claims. (Cl. 260—614)

This invention relates to the manufacture of ethers by reaction of olefins with water in the presence of aqueous hydration catalysts and deals with a more efficient method for carrying out the reaction whereby the rate of reaction may be greatly increased with resulting increased plant capacity, while operating procedure is simplified and made more economical.

Commercially feasible methods for the manufacture of ethers from olefins may be divided into two classes: (1) vapor phase processes in which the ether is either formed in the vapor phase or converted into vapor substantially as fast as formed and (2) liquid phase processes in which the ether is formed in the liquid phase and remains substantially in the liquid state in the reaction mixture. The present invention is concerned solely with processes of the second class as vapor phase processes involve low conversions per pass and low conversion rates as a result of the unfavorable temperature and pressure conditions inherent therein.

In prior liquid phase processes for converting olefins to ether it has been customary to recover the ether produced by distillation of the reaction mixture altho separation of the ether by diluting the reaction mixture with water and then stratifying has also been suggested. Either procedure involves serious disadvantages. Distillation is expensive and leads, in the presence of acid, not only to serious corrosion difficulties, but also to extensive back decomposition of ether to olefin. Water dilution and stratification results in a very incomplete separation of ether which interferes with subsequent reaction unless the dilution is carried to a point at which the catalyst is so reduced in concentration that its activity is materially impaired. It then becomes necessary to reconcentrate the catalyst which is just as expensive as recovery by distillation in the first instance. In addition to these disadvantages of the prior olefin etherification process, which are directly connected with the methods of ether separation used, all the processes heretofore suggested suffer from the further drawback of slow reaction rates which require long times of olefin contact and hence low plant capacities.

I have found that these disadvantageous features of the prior methods are related and that by the application of a simpler and more efficient method of ether removal not only may the difficulties formerly encountered in recovering ether from olefin reaction mixtures be avoided but also the etherification rate may be greatly increased. The process of my invention essentially comprises removal of the ether from the reaction mixture in which it is formed by extraction with a suitable solvent. By this method of operation the etherification rate may be increased five to ten times or more over those previously considered the practical maximum.

Suitable ether solvents include hydrocarbons such as propane, butane, isobutane, the pentanes and higher paraffin hydrocarbons such as isooctane and the like or mixtures thereof such, for example, as suitable fractions of petroleum as gasoline, naphtha, petroleum ether, gas oil or the like or fractions thereof, as well as unsaturated hydrocarbons corresponding to such paraffinic hydrocarbons, as, for example, diisobutylene or a hexene etc., or cyclic hydrocarbons such as benzene, toluene, cyclohexane, tetralin, or the like or suitable substitution products of any such hydrocarbons or hydrocarbon mixtures, particularly halogenation products, such for example, as the chlorethanes or chlorethylenes or carbon tetrachloride or chloroform or higher homologues thereof or chlorbenzene, etc. Another suitable class of ether solvents comprises hydroxy compounds insoluble in aqueous mineral acids such as phenols, cresols, and even higher aliphatic alcohols or the like of which cresylic acid, butyl cresol, ethyl phenol and the like are typical. Similarly insoluble carbonylic compounds, such as ketones, aldehydes, carboxylic acids may be used, including, for example, methyl hexyl ketone, methyl isobutyl ketone, mesityl oxide, benzophenone, stearic acid, benzyl alcohol, terpineol, and the like. Ethers, which are less soluble in the aqueous mixture being extracted than is the ether which it is desired to remove, may be used when desirable, thus anisol, phenetol, and the like, for example, may be used to remove di-isopropyl ether, for example, from its solutions in aqueous mineral acid. Certain stable esters of which tricresyl phosphate is representative, may also be used. As with the hydrocarbon solvents, instead of the chemical individuals technical mixtures of oxygen-containing solvents may be used, such for example, as the mixtures of higher primary and secondary alcohols obtainable by hydrogenation of carbon oxides, or of the secondary and tertiary alcohols obtainable by absorption of olefins of six or more carbon atoms in sulfuric acid and hydrolysis of the resulting absorption products, or the mixed higher alcohols obtainable by controlled oxidation of paraffin hydrocarbons, or mixtures of cyclic hydroxy compounds, such, for example, as the mixed phenols obtainable from the soda sludge of cracked petroleum distillates and the like, or the mixture of cyclic alcohols obtainable by hydrogenation of such mixed phenols. Ketone or ester mixtures such as are obtainable by dehydrogenation or oxidation or by esterification of such alcohol mixtures comprise another technically available source of ether solvents for use in the process of my invention. It is advantageous to include in the solvent or solvent mixture used at least small amounts of phenolic compounds which have a stabilizing influence on the ether produced, such, for example, as hydroquinone, which may be allowed to be carried thru into the finished product in amounts such as 0.1% of the weight of ether more or less which are effective in preventing peroxide formation. I generally use hydrocarbon or halogenated hydrocarbon solvents, however, as the principal solvent in preference to oxy compounds not only because they are usually cheaper and more abundantly available but also because as a class they are less soluble in the aqueous media from which the ether is to be extracted and furthermore have less effect in depressing the etherification rate when the extracted catalyst is reused than an equal amount of an organic oxy compound. I most preferably employ as extractant hydrocarbon material similar to that used as the source of the olefin or olefins involved, such for example, as the olefin-containing hydrocarbon mixture itself or the part thereof remaining after such mixture has been reacted. Thus, for example, where isopropyl ether is being produced from a propane-propylene fraction, a mixture of propane-propylene of reduced propylene content such as would be obtained after etherification of part of the propylene, or propane alone or admixed with other proportions of propylene would be included among my more preferred ether solvents.

My process may be carried out with any suitable etherifiable olefin or olefinic mixture regardless of its source or olefin content. I prefer to operate in the substantial absence of tertiary olefins such as isobutylene, trimethyl ethylene, and the like, because of the tendency of these olefins to polymerize under the conditions usually used for etherification, but such polymerization does not interfere with the etherification of less reactive olefins present. Particularly suitable olefins are ethylene and the secondary olefins such as propylene, butene-1 and -2, the normal pentenes, 2-methyl-pentene-4 and the like. Cyclo-olefins such as cyclopentene, methyl cyclohexene and the like and halogenated olefins such as monochlorethylene, 1-, 2- or 3-chloropropene-1 and higher homologues and/or substitution products may also be etherified by the process of my invention. The olefins may be employed in a pure state or mixed with other compounds. Olefin-containing hydrocarbons such as may be obtained from the cracking of petroleum hydrocarbons or the like constitute particularly useful starting material for the process. I preferably use fractions predominating in hydrocarbons having the same number of carbon atoms per molecule such as a propane-propylene, butane-butylene, pentane-amylene fraction or the like but my invention is not limited thereto as more complex mixtures made up of two or more of such fractions may also be used and in fact when producing ethyl ether from ethylene I may successfully employ a mixture containing considerable methane and hydrogen as well as ethane and ethylene. It is also sometimes advantageous to use fractions or mixtures to which higher boiling hydrocarbons or other compounds have been added.

Any suitable aqueous olefin-etherification catalyst may be used. Because of their economy, ease of handling and flexibility of control I preferably employ aqueous mineral acid acting acids such as hydrochloric, sulfuric, phosphoric, benzene sulfonic and like acids. The concentration of acid used depends upon the olefin or olefins being treated as well as the temperature at which the reaction is carried out and the particular acid chosen. For the production of iso-propyl ether, for example, from hydrocarbon mixtures containing propylene as the only reactive component, sulfuric acid of 70% to about 85% concentration at temperatures of about 125° C. to 80° C. are suitable the higher acid concentrations being used at the lower temperatures and vice versa. Somewhat more drastic conditions may be used in etherifying ethylene while less intensive treatment is preferred for the higher olefins.

Several different methods may be used in carrying out my improved process. Olefins in either the gaseous or liquid state may be employed and batch, intermittent or continuous methods of operation may be used. For the purpose of making my invention more clear, it will be described with more particular reference to the manufacture of di-isopropyl ether from propylene. It will be understood, however, that this is merely for the purpose of simplifying the description and that by suitable modification of operating conditions other olefins may be similarly etherified.

One simple method of operation comprises contacting propylene-containing hydrocarbon with the chosen aqueous hydration catalyst under suitable conditions of temperature and pressure whereby a solution of di-isopropyl ether in the aqueous catalyst medium is obtained and extracting the ether so produced from the catalyst solution by means of an ether solvent which is incompletely miscible with the catalyst solution.

The propylene-containing hydrocarbon may be contacted with the aqueous hydration catalyst by flowing the reactants in countercurrent thru a suitably packed tower or the like, maintained under sufficient pressure to prevent substantial vaporization of the isopropyl ether produced or suitable mixing pumps or other agitating devices may be employed. Another method of operation consists in absorbing the propylene in the aqueous hydration catalyst solution using the relative low temperatures, e. g. between about —10° C. and 50° C., known to favor such absorption and then heating the absorption product, with or without prior removal of unabsorbed hydrocarbons, again using sufficient pressure to maintain the isopropyl ether formed substantially in the liquid phase and separating it subsequently by the extraction process of my invention. When operating in accordance with this modification of my procedure, the absorption and reaction may be carried out in different vessels each particularly adapted to its intended use or a single vessel may be used, such for example, as a high tower or the like cooled at the bottom at which point the olefin-containing hydrocarbon and extracted catalyst solution are admitted and allowed to rise to a heated reaction zone in which the etherification is effected. Still other variations and modifications will be apparent to those skilled in the art.

Altho in certain instances the reaction mixture obtained may be a homogeneous or substantially homogeneous solution of di-isopropyl ether in the aqueous catalyst solution used, more generally mixtures made up of two liquid phases will be found at the end of the reaction stage. The di-isopropyl ether produced will be distributed in accordance with its partition coefficient, between these two phases. Stratification and separation of these phases serve as an advantageous method for effecting a partial recovery of the ether which may then be simply recovered by distillation of the non-aqueous phase. Alternatively, the reaction mixture may be extracted without such intermediate separation, the non-aqueous phase, if any present, being removed with the extract. It is not necessary to carry the extraction to the point of complete removal of di-isopropyl ether from the aqueous catalyst phase. Substantial increases in the reaction rate may be effected by apparently small reductions in the ether content of the catalyst phase as shown by the following results obtained in experiments designed to simulate batchwise, the conditions which would be encountered in a continuous reactor and carried out in a 1 liter steel mixer provided with a 3-inch impeller driven at 1800 R. P. M. and operated at 100° C. under 750 lbs. pressure. As catalyst, sulfuric acid liquor from a previous run which had been extracted to various extents was used. In each case 466 grams of acid liquor and 204 grams of a propane propylene fraction were used.

| Initial ether content of acid liquor | Initial acid concentration (hydrocarbon free basis) | Propylene content of propane propylene fraction | Percent propylene reacted in— | | | | | | |
|---|---|---|---|---|---|---|---|---|---|
| | | | 2 min. | 5 min. | 10 min. | 15 min. | 20 min. | 30 min. | 50 min. |
| Percent | Percent | Percent | | | | | | | |
| 9.5 | 70.2 | 18.5 | 8.5 | 19.0 | 27.5 | 31.5 | 33.5 | 35.0 | 36.0 |
| 5.7 | 72.4 | 18.5 | 23.0 | 33.0 | 38.5 | 39.5 | 40.0 | 40.0 | 40.0 |
| 8.2 | 71.1 | 30.2 | 21.5 | 37.9 | 50.0 | 55.2 | 58.0 | 58.8 | 59.9 |
| 4.5 | 71.0 | 30.2 | 31.5 | 47.8 | 57.1 | 62.0 | 65.0 | 67.9 | 71.4 |

These results show the remarkable increase in reaction rate which may be obtained by using aqueous catalysts of low ether content. I preferably reduce the ether content of the catalyst solution to at least 10% and most preferably to about 5% or lower.

For continuous operation I preferably use a process of the type shown diagrammatically in the accompanying drawing. In the drawing 1 represents a supply pipe for a propane-propylene fraction from a source not shown. The propane-propylene under a pressure preferably of the order of about 500 to 1000 lbs. or more is passed thru an acid trap 2 containing dilute sulfuric acid or the like to remove any traces of constituents more reactive than propylene and thence by pipe line 3 to a connection with water line 4 which is fed regulated amounts of water by pump 5. The water thus introduced is so controlled as to be equivalent to that consumed in the reaction and removed, mechanically, as by solution, or otherwise with the subsequently withdrawn reaction products so that the concentration of the catalyst solution is maintained substantially constant. We generally add the water in liquid form as control of the addition is thereby facilitated but steam or preheated water may also be used. Catalyst losses, if any, may be compensated for by adding catalyst to the water supplied to pump 5. At or about the point at which the water is introduced, extracted catalyst solution is also admitted thru line 17.

The resulting mixture passes by pipe line 6 to pump 7 which serves as a mixer and delivers an emulsion to reactor 8 which is shown as a coil surrounded by a steam jacket but which may have any other suitable form. The temperature and pressure in the reactor are regulated in accordance with the readings of thermometer 10 and pressure gage 11 in the outlet line 9 so that formation of isopropyl ether in the liquid phase takes place at the predetermined rate. The reaction time is controlled by adjustment of the amount of reaction mixture recirculated by means of valve controlled pipe line 12. The withdrawn mixture is conducted to separator 13 where stratification takes place into a hydrocarbon phase taken off thru line 14 and an aqueous catalyst phase removed via line 15. Both phases will usually contain di-isopropyl ether. At least a part of the ether in the aqueous phase is extracted in extractor 16 by means of a suitable solvent therefor, such for example, as a reacted propane-propylene fraction or the like introduced thru line 27. By the use of pentane, iso-octane, or like higher boiling hydrocarbons the extraction may be carried out on the low pressure side of the plant instead of on the high pressure side as shown, permitting less expensive extraction equipment to be used. Any suitable extraction technique may be used and suitable temperature controlling means such as heaters, for example, may be placed in either solution line 15 or solvent line 27 or both or in the extractor 16 in order to maintain the materials under treatment at the temperature most suitable for separation of di-isopropyl ether. The extract is withdrawn thru line 18, added to the di-isopropyl ether-containing hydrocarbon mixture in line 14 and cooled in cooler 19. Where the solvent used for extraction is not sufficiently similar to the hydrocarbon present in line 14, it may be advantageous to separately distill these two materials for recovery of their ether content. They may be distilled together, however, whenever the fractionation of their non-ether components is either unnecessary as when they contain similar hydrocarbons, or when their separation is easily effected as when there is such a difference in boiling characteristics as to permit removal of, say, the solvent as a side-stream or otherwise separately from the unreacted hydrocarbons using a single distillation unit. The drawing illustrates the case where the solvent and unreacted hydrocarbon are similar or identical. The pressure on the mixture is reduced by means of reduction valve 20 and the mixture conducted by line 21 to still 22 where the di-isopropyl ether is recovered as bottom product thru line 23 while the hydrocarbons are taken off overhead via line 24, the part not required for the extraction system is withdrawn thru line 25 for further reaction if its propylene content so permits or for other suitable use. The remainder is pumped by pump 26 thru line 27 to the previously described extractor 16. Other methods may be employed for recovering the di-isopropyl ether from its hydrocarbon solutions, such as water extraction or the like. For certain special uses as where the ether is to be used in a motor fuel, or in lacquers or the like containing ether and hydrocarbon and/or other solvent suitable for such purposes, it may be unnecessary to remove the ether from the extract phase or from the mixture of extract and stratified hydrocarbon.

The advantages of my method of operation are clearly shown by direct comparative tests. In one typical case, for example, where 73% aqueous sulfuric acid was used as catalyst and propylene-containing hydrocarbon of 30 to 35% propylene content constituted the starting material, the reaction was carried out at 100° C. and 700 lbs. pressure with the following results.

|  | No extraction used | Extraction with iso-octane | |
|---|---|---|---|
|  |  | Solvent added before reaction | Solvent extraction after separation of hydrocarbon phase using a volume of solvent equal to the volume of the acid liquor |
| Contact time...minutes.. | 47 | 10 to 11 | 10 to 11 |
| Conversion (percent of propylene in feed converted to ether) | 62 | 50 | 60 |
| Production rate (liters of ether per liter of reaction space per 24 hours) | 2.2 | 10.0 | 11.5 |

These results show that much higher production rates may be obtained by the process of my invention than by prior methods and that this increase may be had without sacrifice in yield. Furthermore, whereas appreciable amounts of catalyst acid were lost in the ether phase as free acid and propyl sulfates in the case where no extraction was employed, making it advisable to neutralize the ether before distillation, no such losses were encountered where extraction with iso-octane was used in the foregoing tests so there was an additional saving of both acid and alkaline reagents.

My invention is not only capable of wide variation with respect to the olefins which may be reacted and the catalysts which may be employed but also in regard to variations in operating details. For example, it will be evident that centrifugal separation may be used not only for separation of the unreacted hydrocarbon from the aqueous catalyst solution of ether illustrated in the drawing as being effected by stratification and decantation in separator 13 but also for separation of extract from extracted catalyst solution. It will also be clear that the water addition shown as being carried out immediately before reaction, i. e., as being added to pipe line 6, may as well, and indeed with certain advantage, be made in pipe line 9 immediately before separator 13 or in pipe line 16 just before extraction as the dilution of the catalyst solution thereby effected is of assistance in facilitating the extraction of the ether. A particularly advantageous variation of the process of my invention consists in carrying out the reaction in two stages with separation of ether between stages. In a typical instance of such operation in which the starting material was a propane-propylene fraction containing about 30% propylene, the first reactor was operated with a contact time of 2.5 minutes and 37% conversion was effected. The ether was removed from the hydrocarbon phase by distillation and the propane-propylene containing about 21% propylene again contacted for 2.5 minutes with the 73% sulfuric acid catalyst and a conversion of 27.5% effected. This corresponds to an overall conversion of 54.3% and a plant capacity of approximately 16 liters of di-isopropyl ether per liter of reaction space per day. Such a process may be carried out with the apparatus illustrated in the drawing, for example, by connecting drawoff pipe 25 with a duplicate of reaction system 3, 4, 5, 6, 7, 8, 9, 13, etc. Furthermore instead of the simple catalysts described as suitable, more complex mixtures may be used made up of these or other suitable catalysts together with materials which have a favorable influence on the operations, such, for example, as materials which promote the absorption of olefins in acid such as silver sulfate, etc., and/or corrosion inhibitors such as suitable organic nitrogen bases or the like or emulsifying agents for increasing the surface of contact between olefin and catalyst etc. It will therefore be clear that my invention is not to be limited to the details of operation described nor by any theory advanced in explanation of the improved results attained, but only by the terms of the accompanying claims in which it is my intention to claim all novelty inherent therein as broadly as possible in view of the prior art.

I claim as my invention:

1. In a process of producing an ether from an olefin by contacting a paraffin olefin mixture with an aqueous olefin-hydrating mineral acid catalyst at a temperature and pressure at which an aqueous acid solution containing said ether is obtained, the steps of separating unreacted hydrocarbon containing ether from the reacted mixture, then extracting the remaining aqueous, ether-containing, solution with solvent for said ether which solvent is incompletely miscible with said solution under the extraction conditions, and reacting the extracted olefin-hydrating mineral acid catalyst solution with a further quantity of the paraffin-olefin mixture.

2. A cyclic process of producing di-isopropyl ether from propylene which comprises contacting propylene containing hydrocarbon with aqueous sulfuric acid of a concentration and a temperature and pressure and for a time at which di-isopropyl ether in the liquid phase is produced, stratifying at least a part of the reacted mixture into an aqueous sulfuric acid phase containing di-isopropyl ether and a hydrocarbon phase, separating said phases, extracting di-isopropyl ether from the separated aqueous phase with an organic solvent therefor and reacting the extracted sulfuric acid solution obtained with a further amount of propylene.

3. A process for producing di-isopropyl ether by reacting propylene with aqueous sulfuric acid at a temperature and pressure at which di-isopropyl ether in the liquid phase is produced without diluting the sulfuric acid to a concentration below 70% on a hydrocarbon basis which comprises adding to the liquid reaction products a hydrocarbon solvent for di-isopropyl ether, withdrawing the resulting di-isopropyl ether-containing hydrocarbon phase and recovering ether therefrom, extracting di-isopropyl ether from the remaining aqueous sulfuric acid phase with an organic solvent for said ether which solvent is incompletely miscible with said aqueous acid under the extraction conditions and reacting the extracted sulfuric acid with a further amount of propylene.

4. A process of producing an ether from an olefin which comprises reacting an olefin with an aqueous hydration catalyst at a temperature and pressure and for a time at which a solution of said ether in said aqueous catalyst is produced, separating ether from the reacted mixture in the form of a hydrocarbon solution without diluting said catalyst to a concentration at which it is ineffective for the conversion of said olefin to said ether, removing ether from the remaining aqueous hydration catalyst by extraction with a solvent for said ether, which solvent is incompletely miscible with said solution under the extraction conditions, and reacting the extracted catalyst solution with further quantities of olefin.

5. A process of producing an ether from an olefin which comprises reacting a secondary olefin-containing hydrocarbon with an aqueous acid hydration catalyst at a temperature and for a time at which a solution of said ether in said aqueous catalyst is produced, separating ether from the reacted mixture as a solution thereof in the unreacted hydrocarbon present without substantially reducing the concentration on a hydrocarbon free basis of said catalyst, removing a further amount of ether from the aqueous hydration catalyst by extraction with a hydrocarbon solvent for said ether and reacting the extracted catalyst solution with further olefin.

6. A process of producing an ether from an olefin which comprises absorbing a secondary olefin in an aqueous mineral acid of olefin absorption strength, heating the resulting absorption product at a temperature and pressure at which a solution of ether in said acid is obtained, separating ether from the reacted mixture without diluting said acid to a concentration at which it is ineffective for the conversion of said olefin to said ether, then extracting ether from the remaining aqueous acid by means of a solvent for said ether which is incompletely miscible with said acid under the extraction conditions, and returning the extracted aqueous acid to the olefin reaction stage without any preliminary concentration of said acid catalyst.

7. A process of producing an ether from an olefin which comprises reacting said olefin in the presence of an aqueous hydration catalyst at a temperature and pressure at which a reaction mixture made up of two liquid phases each containing said ether is obtained, separating the aqueous hydration catalyst phase from the ether containing non-aqueous phase, extracting the separated aqueous hydration catalyst phase with sufficient solvent for said ether which solvent is incompletely miscible with said catalyst phase under the extraction conditions to reduce the ether content thereof to at least 15% and returning the extracted catalyst solution to the olefin reaction stage.

8. A process of producing di-isopropyl ether which comprises reacting propylene-containing hydrocarbon with sulfuric acid of at least 70% concentration at between about 80° C. and about 125° C. for a time and under a pressure at which di-isopropyl ether is produced, stratifying the reaction mixture without diluting the sulfuric acid to a concentration below 70% on a hydrocarbon free basis into a hydrocarbon phase containing a part of the di-isopropyl ether formed in said reaction and an aqueous sulfuric acid phase also containing di-isopropyl ether, separating said phases, removing di-isopropyl ether from the separated sulfuric acid phase with an organic solvent for said ether which solvent is incompletely miscible with said acid under the extraction conditions and reacting the extracted sulfuric acid with a further amount of propylene.

CHARLES F. OLDERSHAW.